United States Patent [19]

Sokolov et al.

[11] 4,136,656
[45] Jan. 30, 1979

[54] LOAD CONTROL DEVICE FOR TURBO-SUPERCHARGED DIESEL ENGINES

[75] Inventors: Sergei S. Sokolov; Viktor K. Safonov; Leonid I. Vlasov, all of Leningrad, U.S.S.R.

[73] Assignee: Tsentralny Nauchno-Issledovatelsky Dizelny Institut, U.S.S.R.

[21] Appl. No.: 819,106

[22] Filed: Jul. 26, 1977

[51] Int. Cl.² .......................... F02D 1/04; F02D 1/06
[52] U.S. Cl. ........................ 123/140 FG; 123/140 MP
[58] Field of Search .................. 123/140 FG, 140 MP

[56] References Cited

U.S. PATENT DOCUMENTS

| | | | |
|---|---|---|---|
| 2,602,654 | 7/1952 | Parker | 123/140 FG UX |
| 2,868,184 | 1/1959 | Moulton | 123/140 FG |
| 3,077,873 | 2/1963 | Parks et al. | 123/140 MP |
| 3,814,072 | 6/1974 | Gillespie | 123/140 MP X |

Primary Examiner—John J. Vrablik
Assistant Examiner—Michael Koczo, Jr.
Attorney, Agent, or Firm—Steinberg & Blake

[57] ABSTRACT

The present invention relates to control devices and can most advantageously be used in load control devices for turbo-supercharged diesel engines operating over a wide range of operating conditions when frequent unsteady periods of operation caused by variations in the load take place. This control device comprises a crankshaft speed measuring mechanism, a pilot valve, a servomotor with a tailrod, a passage providing hydraulic connection of the pilot valve with the servomotor. A servomotor tailrod stroke limiter is mounted within said passage and comprises a stationary fixed casing, a sleeve and a plunger, both movable with respect to the stationary fixed casing and with respect to each other. The sleeve is connected to a pressure sensor, while the plunger, to the tail-rod of the servomotor. Such a constructional arrangement enables a separate control of the load as a function of air supply and fuel supply.

1 Claim, 2 Drawing Figures

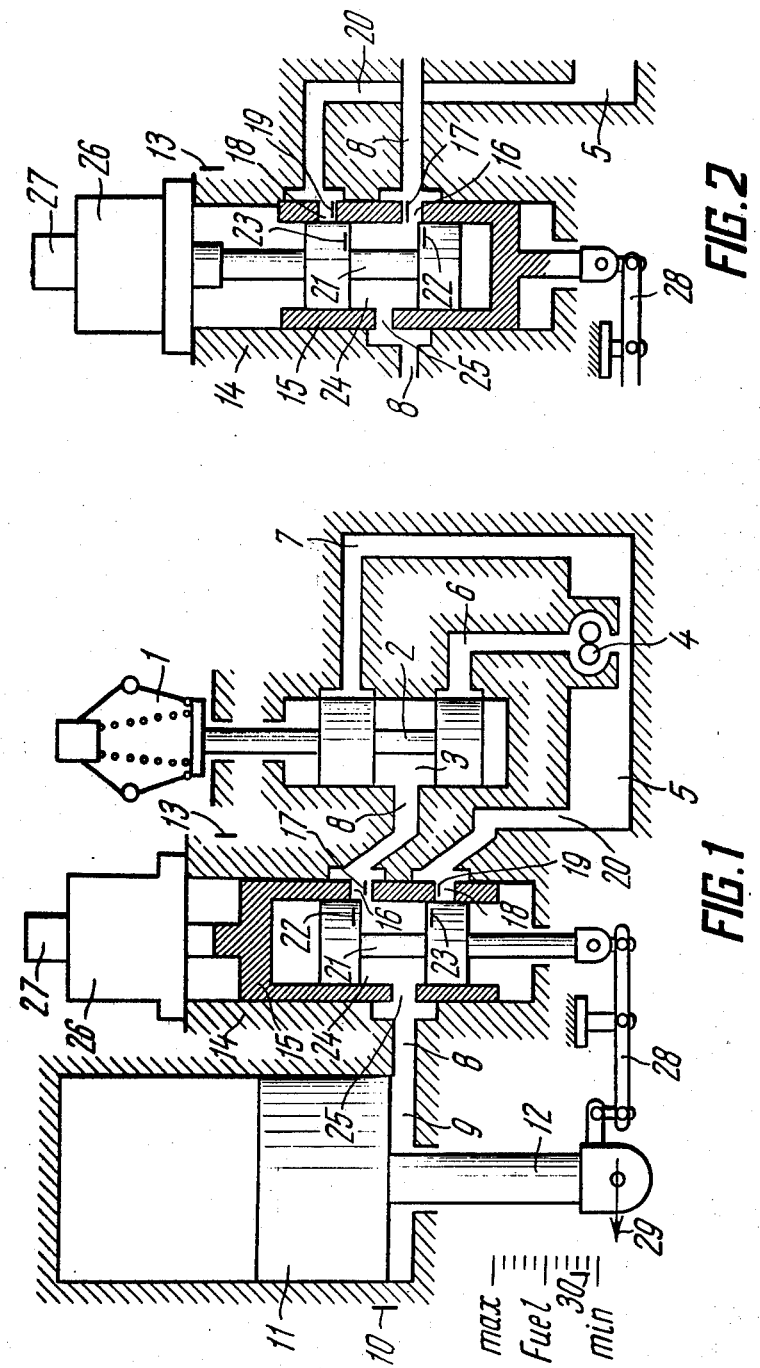

LOAD CONTROL DEVICE FOR TURBO-SUSPERCHARGED DIESEL ENGINES

The present invention relates to control devices, and more particularly to load control devices for turbo-supercharged diesel engines.

The present invention can most advantageously be used with diesel engines operating over a wide range of operating conditions when frequent variations in the load during unsteady periods of acceleration take place.

BACKGROUND OF THE INVENTION

It is well known that turbo-supercharged diesel engines cannot operate efficiently at high power level unless its charging air pressure defining air supply is properly matched with the rate of fuel supply, and that when diesel engine crankshaft speed is caused to change by sudden application of load, or when the speed setting of the governor of the diesel engine is abruptly changed, i.e., when the unbalance of the rates of fuel supply and of air supply occurs.

In such cases the turbo-supercharged diesel engine combusts inefficiently the fuel supplied thereto until the turbo-supercharger causes the air pressure to become increased to an amount corresponding to a new load, i.e. to a new rate of fuel supply.

The disturbance of the matched rate of fuel supply and air supply, i.e., the unbalance of fuel and air leads to an excessive smoke of the engine exhaust, to an increased yield of toxic components in the exhaust gases, to a significant deposit of soot in the combustion chamber and exhaust passage, decreasing an efficiency of the diesel engine.

For preventing such unbalance of air and fuel supply during the periods of unsteady operating conditions diesel engines are equipped with load control devices.

In the heretofore known load control devices adjusting the load on an engine as a function of charging air pressure and rate of fuel supply, the control of the load fitted to the charging air, is accomplished through a means governing the load in accordance with the rate of fuel supply.

A control device implementing this principle is known for matching the fuel to the air, said device limiting the load on a diesel engine, in case the charging air is below normal pressure, incorporating an integrating device connected to a fuel supply sensor and to a charging air pressure sensor.

When the rate of fuel supply is properly matched with the rate of air supply (charging air pressure), the integrating device in which the ratio between the fuel and the air is programmed, forces down through an actuator a spring thrust limiting the displacement of a tailrod of the servo and disconnects the spring thrust in case charging air pressure exceeds the programmed value.

The mechanical action on the tailrod of the servo fails to provide its stable operation, which results in unstable fuel supply, while the loading of the mechanical linkage connecting the tailrod of the servo to a controlled element (fuel rod) causes an additional frictional wear on kinematic pair.

A fuel limiter designed by WOODWARD GOVERNOR CO for turbo-supercharged engines is also known. This fuel limiter adjusts the load on an engine as a function of charging air pressure.

The fuel limiter comprises a pressure sensor, charging air pressure being brought thereto, and a kinematic linkage operatively connecting the pressure sensor with a cranckshaft speed measuring mechanism and with a tailrod of the servo, said kinematic linkage integrating the displacement of the pressure sensor actuator caused by changes in the rate of air supply and the displacement of the tailrod of the servo caused by changes in the rate of fuel supply and transmitting them to the pilot valve of the crankshaft speed measuring mechanism.

However, it is extremely difficult even for experienced governor technicians to adjust this type of control mechanism on an engine, therefore it is set on a test rig equipped with a means (e.g., a vacuum pump and manometer) capable of simulating different air pressures needed to check the linkage adjustments.

Also known is a diesel engine load limiting control device (Cf. U.S. Pat. No. 2,868,184), comprising a crankshaft speed measuring mechanism, a pilot valve mechanically connected to said crankshaft speed measuring mechanism, a sump containing hydraulic fluid, a pump located within said sump, a passage hydraulically connecting the pump to the pilot valve, a servomotor having a tailrod, a passage providing hydraulic linkage of the pilot valve with the servomotor, and a servomotor tailrod stroke limiter, said limiter having one movable element and being located within said passage providing hydraulic linkage of the pilot valve with the servomotor. The movable element of the servomotor tailrod stroke limiter is mechanically connected to the speed measuring mechanism, to the tailrod of the servomotor and to the pressure sensor, charging air pressure being brought thereto.

The servomotor tailrod stroke limiter is connected to the sump through a passage.

Thus, the load control is provided as a function of rotational speed of the crankshaft of the diesel engine (rate of fuel supply) and of charging air pressure (rate of air supply) with the use of only one element, such a constructional arrangement resulting in an extremely intricate kinematic chain of the control device.

Besides, in the prior-art control devices the servomotor tailrod stroke limiter is arranged inside the control device and forms its integral part, thus preventing to employ said limiter as an independent unified assembly.

SUMMARY OF THE INVENTION

It is an object of the present invention to provide a control device, wherein the control of the load on a turbo-supercharged diesel engine as a function of charging air pressure (rate of air supply) and of crankshaft rotational speed (rate of fuel supply) should be attained by independent devices, thus simplifying both the construction and adjusting of the control device.

It is another object of the present invention to provide a load limiter accomplished as an independent unified assembly which can be used in combination with control devices of various serviceability.

With these and other objects in view, there is proposed a load control device for turbo-supercharged diesel engines comprising a diesel engine crankshaft measuring mechanism, a pilot valve, a sump, a pump, a passage providing hydraulic connection of the pilot valve to the pump, a servomotor having a tailrod and a chamber, a passage providing hydraulic connection of the pilot valve to the chamber of the servomotor, a servomotor tailrod stroke limiter located within said passage hydraulically connecting the pilot valve to the servomotor, including a first element connected to a pressure sensor, a passage for hydraulic connection of the servomotor tailrod stroke limiter to the sump, wherein, according to the invention, the servomotor tailrod stroke limiter is provided with a second element coacting with said first element, both mounted within a stationary fixed casing and are slidable with respect to each other and to said stationary fixed casing, the second element being mechanically linked with the tailrod of the servomotor.

When two elements are incorporated in the servomotor tailrod stroke limiter, one of said elements being connected to the pressure sensor and controlling the load in accordance with the rate of air supply, while the other element is connected to the tailrod of the servomotor and controls the load in accordance with the rate of fuel supply, it is possible to ensure an independent load control as a function of air and fuel supply, thus eliminating intricate integrating mechanical linkages and substantially simplifying the construction of the control device.

Other objects and advantages of the invention will become apparent from the following detailed description taken in connection with the accompanying drawings, wherein:

BRIEF DESCRIPTION OF THE DRAWINGS

FIG. 1 is a schematic view showing a load control device for turbo-supercharged diesel engine, according to the invention.

FIG. 2 is a schematic view of the other embodiment of mechanical connection of the servomotor tailrod stroke limiter, according to the invention.

DETAILED DESCRIPTION OF THE INVENTION

The load control device for turbo-supercharged diesel engine comprises a crankshaft speed measuring mechanism 1 (FIG. 1) of any known construction suitable for the present invention and a pilot valve 2 provided with a chamber 3, said pilot valve 2 being mechanically connected to the crankshaft speed measuring mechanism 1. A pump 4 is located within a sump 5 containing the hydraulic fluid. The hydraulic fluid as from the pump 4 and the sump 5 is admitted through a passage 6 by the pilot valve 2 to the chamber 3, the latter being connected by the same pilot valve 2 and a passage 7 to the sump 5. The chamber 3 is continuously connected to a passage 8, said passage being connected with a chamber 9 of a servomotor 10 having a piston 11 and a tailrod 12.

Situated within the passage 8 is a stroke limiter 13 of the tailrod 12 of the servomotor 10, said limiter dividing the passage 8 into two portions, one of said portions being disposed on the side of the pilot valve 2, the other, on the side of the servomotor 10.

The stroke limiter 13 of the tailrod 12 of the servomotor 10 consists of a stationary fixed casing 14 and a sleeve 15 slidable inside the casing 14. The sleeve 15 is fitted with a port 16 having a land 17. The port 16 opens on the passage 8 on the side of the chamber 3 of pilot valve 2. The sleeve 15 is fitted with a port 18 having a land 19, said port 18 opening on a passage 20 hydraulically connecting the stroke limiter 13 of the tailrod 12 of the servomotor 10 to a sump 5.

Mounted inside the sleeve 15 is a plunger 21, said plunger being movable with respect to the casing 14 and the sleeve 15. The plunger 21 has lands 22 and 23 forming a chamber 24 therebetween, said chamber 24 being continuously connected through a port 25 to the passage 8 on the side of the chamber 9 of the servomotor 10.

The sleeve 15 is mechanically linked with a pressure sensor 26, the latter being communicated via a pipe connection 27 to a charging air pressure sensor (not shown). The pressure sensor 26 converts the pressure of the air into linear displacement of the sleeve 15.

The plunger 21 is connected through a mechanical linkage 28 with the tailrod 12 of the servomotor 10. The tailrod 12 of the servomotor 10 is furnished with an indicator formed by a pointer 29 and a scale 30, its readings being proportional to the rate of fuel supply.

FIG. 2 shows another embodiment of the operative connection of the stroke limiter 13 of the tailrod 12 of the servomotor 10, incorporated into the load control device, wherein the plunger 21 is mechanically connected to the pressure sensor 26, while the sleeve 15 is connected to the mechanical linkage 28.

OPERATION

Under steady-state operating conditions of the turbo-supercharged diesel engine the rate of fuel supply is properly matched with the load setting and with the speed of rotation of the diesel engine crankshaft: when in cutting-off position, the pilot valve 2 mechanically connected the crankshaft speed measuring mechanism 1 prevents both the supply of the hydraulic fluid by the pump 4 from the sump 5 to the chamber 3 of the pilot valve 2 through the passage 6, resulting in an increased rate of fuel supply by the servomotor 10, and the leakage of the hydraulic fluid from the chamber 3 of the pilot valve 2 to the sump 5 through the passage 7, resulting in a decrease in rate of fuel supply by the servomotor 10.

When the rate of air supply fits the rate of fuel supply, the land 17 of the sleeve 15 coacting with the land 22 of the plunger 21 uncovers the port 16 of the sleeve 15, thus ensuring the hydraulic linkage of the chamber 24 continuously connected through the port 25 of the sleeve 15 to the portion of the passage 8 on the side of the chamber 9 of the servomotor 10, with the chamber 3 of the pilot valve 2 through the other portion of the passage 8. At the same time the land 19 of the sleeve 15 coacting with the land 23 of the plunger 21 covers the port 18, disconnecting the chamber 24 from the passage 20 continuously connected to the sump 5. By this means, the chamber 9 of the servomotor 10 is connected through the uncovered passage 8 to the chamber 3 of the pilot valve 2.

The position of the tailrod 12 of the servomotor 10 is determined by the pilot valve 2 of the speed measuring mechanism 1, maintaining the rate of fuel supply to match the speed and load operating conditions of the turbo-supercharged diesel engine.

In response to a decrease in diesel engine crankshaft speed or to a setting higher speed in the crankshaft speed measuring mechanism the pilot valve 2 uncovers the passage 6 admitting the hydraulic fluid to flow from the sump 5 into the chamber 3 and, further on through the passage 8 on the side of the pilot valve 2 and through the port 16 uncovered by the lands 17 and 22, into the chamber 24, and, still further, through the passage 8 on the side of the chamber 9 of the servomotor 10, into the chamber 9, thus moving the piston 11 and the tailrod 12 of the servomotor 10 in the fuel-increasing direction and so increasing the rate of fuel supply as it is indicated by the pointer 29 on the fuel supply scale 30.

The displacement of the piston 11 and the tailrod 12 of the servomotor 10 through the mechanical linkage 28 forces the plunger 21 with its land 22 downwardly to cover the port 16. As this takes place the hydraulic fluid flows from the chamber 3 of the pilot valve 2 through the passage 8 into the chamber 24 until the lands 17 and 22 cover the port 16, thus disconnecting the chamber 24 from the portion of the passage 8 on the side of the pilot valve 2. The hydraulic fluid flow from the chamber 3 to the chamber 9 of the servomotor 10 is cut off.

The further fuel-increasing movement of the tailrod 12 of the servomotor 10 will be eliminated as the land 19 of the sleeve 15, coacting with the land 23 of the plunger 21 uncovers the port 18, thus providing the linkage of the chamber 24, with the passage 20, the latter being continuously connected to the sump 5. The hydraulic fluid will flow from the chamber 9 of the servomotor 10 to the sump 5 through the portion of the passage 8, the continuously uncovered port 25, the chamber 18 and the passage 20. This leakage of the hydraulic fluid causes the piston 11 to move downwardly. At the same time the piston 11, while acting through the mechanical linkage 28 moves the plunger 21 and the land 19 of the sleeve 15, coacting with the land 23 of the plunger 21 covers the port 18, whereby the leakage of the hydraulic fluid from the chamber 9 of the servomotor 10 into the sump 5 is cut off.

As the charging air pressure, i.e., the rate of air supply, increase with an increase in the load on the diesel engine, the pressure sensor 26 continuously connected through the pipe connection 27 to the charging air pressure sensor, displaces the sleeve 15 joined thereto, whereby the land 17 of the sleeve 15 moves with respect to the land 22 of the plunger 21, thus uncovering the port 16 and connecting the chamber 3 of the pilot valve 2 to the chamber 9 of the servomotor 10 through the portion of the passage 8, the port 16, the chamber 24, the continuously uncovered port 25 and the portion of the passage 8.

As the hydraulic fluid is delivered into the chamber 9 of the servomotor 10, the piston 11 moves upwardly to increase the supply of fuel.

On reaching the minimum rate of air supply allowable for the predetermined rate of fuel supply, due to an increase in the charging air pressure as the load on the diesel engine increases, the pilot valve 2 mechanically linked with the speed measuring mechanism 1 provides a new position of the tailrod 12 corresponding to changed operating conditions. On reaching said new operating conditions the pilot valve 2 is shut off.

When the charging air pressure is abruptly decreased, e.g., because of the turbo-supercharger damage, this air pressure drop is detected at the inlet of the pressure sensor 26, whereby the sleeve 15 is displaced and its land 17 coacting with the land 22 of the plunger 21 covers the port 16. At the same time, the land 19 of the sleeve 15, coacting with the land 23 of the plunger 21 uncovers the port 18, thus admitting the hydraulic fluid to flow from the chamber 9 of the servomotor 10 into the sump 5 along the circuit comprised of the portion of the passage 8, the continuously uncovered port 25, the chamber 24, the uncovered port 18 and the passage 20. As this takes place, the piston 11 with its tailrod 12 is moved in the fuel decreasing direction.

The plunger 21 connectwd via the mechanical linkage 28 with the tailrod 12 is also moved, whereby the land 23 of the plunger 21, coacting with the land 19 of the sleeve 15 covers the port 18 to interrupt the flow of the hydraulic fluid from the chamber 9 of the servomotor 10 into the sump 5.

The piston 11 of the servomotor 10 can move until the maximum admissible rate of fuel supply corresponding to a new decreased rate of air supply is reached. On reaching the maximum admissible rate of air supply corresponding to the emergency rate of fuel supply, the port 18 is completely closed.

The stroke limiter 13 (FIG. 2) of the tailrod 12 of the servomotor 10 being incorporated into the load control device of the turbo-supercharged diesel engine so that the sleeve 15 is connected to the mechanical linkage 28, while the plunger 21 is mechanically linked with the pressure sensor, its operation being analogous to that described hereinabove.

In the described embodiment of the invention air pressure, i.e., the rate of air supply is used as a parameter controlling fuel supply, but it is to be understood that other parameters, such as water and oil pressure or temperature, rotational speed of the crankshaft may also be used for controlling the same.

Several tailrod stroke limiters controlled by various parameters, and arranged in series within the passage 8 to ensure the hydraulic linkage of the chamber 3 of the pilot valve 2 with the chamber 9 of the servomotor 10, enable one to control at a time the load on the diesel engine as a function of several parameters.

While the embodiment of the present invention as herein disclosed, constitutes a preferred form, it is to be understood that other forms might be adopted, all coming within the scope of the claim which follows.

What is claimed is:

1. A load control device for turbo-supercharged diesel engines, comprising:
    a diesel engine crankshaft speed measuring mechanism;
    a pilot valve connected to said diesel engine crankshaft measuring mechanism;
    a sump containing hydraulic fluid;
    a pump located within said sump for delivering hydraulic fluid into said pilot valve;
    a first passage hydraulically connecting said pilot valve to said sump;
    a servomotor having a tailrod and means hydraulically connecting the servomotor to said pilot valve;
    a second passage hydraulically connecting said pilot valve to said servomotor;
    a stroke limiter of said tailrod of said servomotor, located within said second passage;
    a stationary fixed casing of said tailrod stroke limiter having ports therein communicating with said second passage;
    two valve elements mounted within said stationary fixed casing, said elements being movable with respect to said stationary fixed casing and with respect to each other in order to provide a valving function;
    means connecting one of said elements to said tailrod of said servomotor;
    a third passage hydraulically connecting said tailrod stroke limiter to said sump; and
    a pressure sensor, charging air pressure being supplied thereto, means connecting said pressure sensor to said second element of said tailrod stroke limiter.

* * * * *